Jan. 14, 1930.  A. M. NADELL  1,743,377
AUTOMOBILE SEAT
Filed Oct. 1, 1927

Inventor
Abraham M. Nadell,
By
Attorneys

Patented Jan. 14, 1930

1,743,377

UNITED STATES PATENT OFFICE

ABRAHAM M. NADELL, OF DETROIT, MICHIGAN

AUTOMOBILE SEAT

Application filed October 1, 1927. Serial No. 223,274.

The present invention pertains to a novel automobile seat, and the principal object is to provide a device of this character which is adjustable to suit the convenience of the driver or passengers.

In the accomplishment of this object, there is provided a pad which slides relatively to the back of the seat, and devices of various kinds may be employed for adjusting the pad to any desired position. This arrangement dispenses with the necessity of cushions inserted between the back of the occupant and the back of the seat, and further provides an adjustment which remains fixed as long as desired.

The invention is fully disclosed by way of example in the following description and in the accompanying drawing, in which—

Reference to these views will now be made by use of like characters which are employed to designate corresponding parts throughout.

Figure 1:
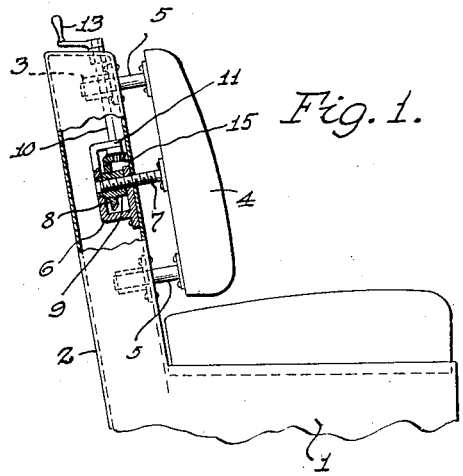
Figure 1 is a side elevation of a seat, partly in section.
Figure 2:
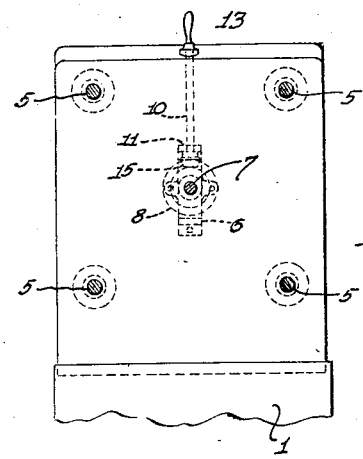
Fig. 2 is a front elevation thereof.

In Figure 1 is illustrated a seat 1 having a hollow back 2 within and at the corners of which are fixed bushings 3. At the forward side of the back member is provided a pad 4 having at its corners stems 5 which are slidable in the bushings 3. The bracket or bearing 6 is supported within the hollow back between the upper and lower edges thereof and receives a screw 7 which has one end fixed to the pad 4. On this screw is mounted a bevel gear 8 having a hub 9 of such length as to snugly fit within the bracket, so that the member 8 may not slide. A shaft 10 is journalled between the top of the back element and the upper arm 11 of the bracket 6 and occupies a substantially upright position. The lower end of this shaft carries a bevel pinion 15 meshing with the gear 8 and has its upper end equipped with an operating crank 13. On turning this crank the gear 8 will also be turned, and since this gear is held against sliding, the screw 7 will be moved axially in one direction or the other, whereby the pad 4 is adjusted relatively to the back.

Figure 3:
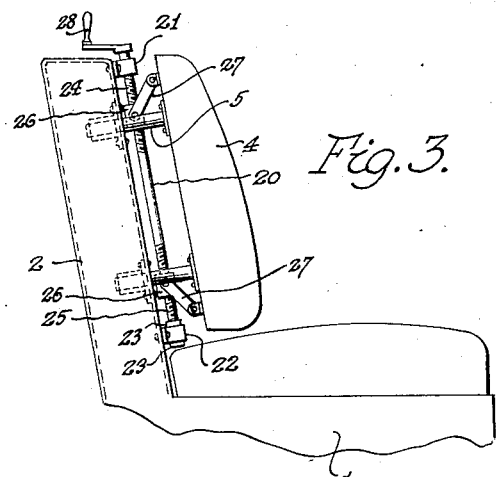
Fig. 3 is a side elevation of a modified construction.
Figure 4:
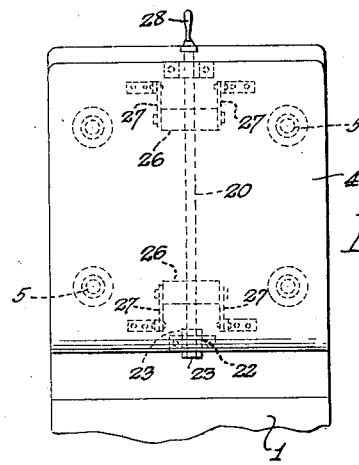
Fig. 4 is a front elevation thereof.

In the construction shown in Figures 3 and 4 there is provided a modified operating means which includes a shaft 20 standing in a substantially upright position between the back 2 and pad 4. The ends of the shaft are received in bearings 21 and 22 at the upper and lower edges respectively of the back 2, and the lower end of the shaft carries collars 23 engaging the top and bottom of the bearing 22 so that the shaft is held against axial movement. Lefthand and righthand threads 24 and 25 are formed at the ends of the shaft and are engaged by nuts 26. These nuts are somewhat elongated transversely of the shaft as shown more clearly in Figure 4 and have their ends joined to the back of the pad 4 by links 27. At the upper end of the shaft is provided a crank 28, which when turned rotates the shaft without permitting the sliding movement thereof, whereupon the nuts 26 are slid in opposite directions axially of the shaft. Such movement retracts or expels the links 27, according to the direction in which the crank is turned, whereupon the pad 4 is moved relatively to the back 2.

Figure 5:
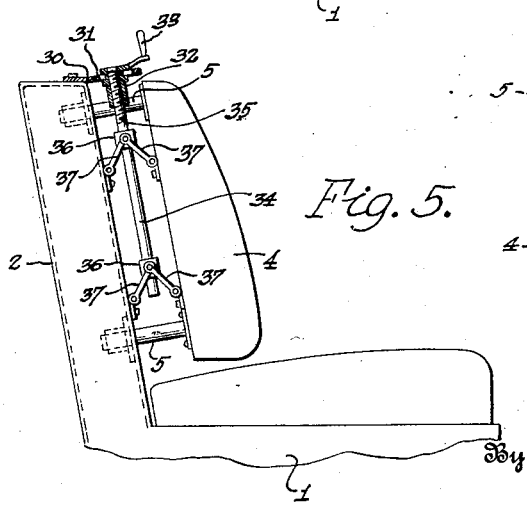
Fig. 5 is a side elevation, partly in section of another embodiment.
Figure 6:
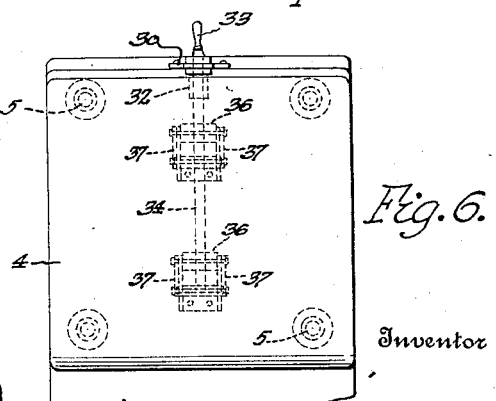
Fig. 6 is a front elevation thereof.

Still another adjusting means is shown in Figures 5 and 6 wherein a bracket 30 secured to the top of the back 2 extends in the direction of the pad 4. The bracket 30 has a longitudinal slot 31 in which a nut 32 is slidably mounted, and the nut is equipped with a handle or crank 33 for operating purposes as will presently appear. A shaft 34 positioned between the members 2 and 4 and occupying a substantially upright position has its upper end threaded as at 35 and screwed into the nut 32.

Blocks 36 secured to the shaft 34 have their ends joined by means of links 37 to the confronting faces of the back 2 and pad 4. On turning the crank 33, the shaft and blocks are slid up or down without turning and the distance between the members 2 and 4 is decreased or increased. The movement of the links causes a shifting of the shaft 34 and nut 32 which is permitted by the slidable mounting of the nut in the bracket 30.

Although specific embodiments of the invention have been illustrated and described, it will be understood that various alterations in the details of construction may be made without departing from the scope of the invention as indicated by the appended claim.

What I claim is:—

In a seat, a back, a pad supported by said back and movable forwardly therefrom, a screw rotatably supported by said back and held against axial movement, said screw having a left hand and right hand threads, nuts on said threads and linked to said pad, and a crank on said screw for turning the same.

In testimony whereof I affix my signature.

ABRAHAM M. NADELL.